US009462162B2

(12) United States Patent
Paul

(10) Patent No.: US 9,462,162 B2
(45) Date of Patent: Oct. 4, 2016

(54) METHOD FOR CONTROLLING COLOR SEPARATIONS REGISTRATION

(71) Applicant: OCE PRINTING SYSTEMS GMBH & CO. KG, Poing (DE)

(72) Inventor: Andreas Paul, Vaterstetten (DE)

(73) Assignee: Océ Printing Systems GmbH & CO. KG, Poing (DE)

( * ) Notice: Subject to any disclaimer, the term of this patent is extended or adjusted under 35 U.S.C. 154(b) by 0 days.

(21) Appl. No.: 14/400,755

(22) PCT Filed: May 29, 2013

(86) PCT No.: PCT/EP2013/001591
§ 371 (c)(1),
(2) Date: Feb. 19, 2015

(87) PCT Pub. No.: WO2013/178360
PCT Pub. Date: Dec. 5, 2013

(65) Prior Publication Data
US 2015/0156376 A1  Jun. 4, 2015

(30) Foreign Application Priority Data
May 29, 2012 (DE) .................. 10 2012 104 584

(51) Int. Cl.
H04N 1/46 (2006.01)
H04N 1/60 (2006.01)
(Continued)

(52) U.S. Cl.
CPC ......... H04N 1/6044 (2013.01); B41F 33/0081 (2013.01); G03G 15/5062 (2013.01); H04N 1/6038 (2013.01); B41P 2233/52 (2013.01);
(Continued)

(58) Field of Classification Search
None
See application file for complete search history.

(56) References Cited

U.S. PATENT DOCUMENTS 4,546,700 A  10/1985 Kishner et al.
5,696,890 A * 12/1997 Geissler .................. B41F 13/12
356/402

(Continued)

FOREIGN PATENT DOCUMENTS

DE  19638967 A1  4/1998
DE  19701967 A1  7/1998
(Continued)

Primary Examiner — Dung Tran
(74) Attorney, Agent, or Firm — Schiff Hardin LLP

(57) ABSTRACT

In a method to control a color printer or color copier, a color separation of a first color and a color separation of a second color are applied to a printing substrate to generate a print image. Also, with aid of a printing unit, at least a first control field is printed on the printing substrate. The first control field has a predetermined pattern that includes at least the first color and the second color and is designed such that a color value of the first control field changes depending on a registration error between the first and the second color separations. A reference field is also printed on the printing substrate, a pattern of the reference field being predetermined such that it has a same color value independent of the registration error. The color value of the first control field is measured with a color value sensor. The color value of the reference field is also measured with the color value sensor and a desired color value is determined depending on the color value of the reference field. A deviation between the measured color value of the first control field and the desired color value is determined, the deviation corresponding to a spatial shift of the color separations. At least one control signal is generated to reduce the spatial shift depending on the determined deviation.

16 Claims, 9 Drawing Sheets

(51) Int. Cl.
  *B41F 33/00* (2006.01)
  *G03G 15/00* (2006.01)
(52) U.S. Cl.
  CPC ............... *G03G 2215/00455* (2013.01); *G03G 2215/0141* (2013.01); *G03G 2215/0161* (2013.01); *H04N 2201/0005* (2013.01); *H04N 2201/0094* (2013.01)

(56) References Cited

U.S. PATENT DOCUMENTS

| | | | |
|---|---|---|---|
| 5,751,450 A * | 5/1998 | Robinson | G01J 3/46 358/504 |
| 6,065,400 A | 5/2000 | Van Weverberg | |
| 6,109,183 A | 8/2000 | Papritz et al. | |
| 6,198,549 B1 * | 3/2001 | Decker | H04N 1/506 347/19 |
| 6,682,163 B2 | 1/2004 | Metzler et al. | |
| 6,880,458 B2 | 4/2005 | Munz et al. | |
| 7,184,700 B2 | 2/2007 | Spilz et al. | |
| 7,396,099 B2 | 7/2008 | Teshigawara et al. | |
| 7,637,210 B2 | 12/2009 | Geissler et al. | |
| 8,204,416 B2 * | 6/2012 | Calamita | G03G 15/5058 399/301 |
| 8,270,049 B2 * | 9/2012 | McElvain | H04N 1/58 358/1.9 |
| 8,355,189 B2 * | 1/2013 | Shacham | B41F 15/10 358/533 |
| 8,405,879 B2 | 3/2013 | Boness et al. | |
| 8,601,947 B2 | 12/2013 | Kaiser et al. | |
| 8,813,647 B2 | 8/2014 | Hauck et al. | |
| 2003/0210412 A1 * | 11/2003 | Ishibashi | H04N 1/506 358/1.9 |
| 2005/0157317 A1 * | 7/2005 | Butterfield | G01J 3/46 358/1.9 |
| 2010/0007690 A1 | 1/2010 | Geissler et al. | |
| 2013/0259542 A1 * | 10/2013 | Aviv | G03G 15/0131 399/301 |

FOREIGN PATENT DOCUMENTS

| | | |
|---|---|---|
| DE | 19738992 A1 | 3/1999 |
| DE | 10204681 A1 | 8/2003 |
| DE | 102006036587 A1 | 2/2008 |
| EP | 0083086 A1 | 7/1983 |
| EP | 2127877 A2 | 12/2009 |

* cited by examiner

METHOD FOR CONTROLLING COLOR SEPARATIONS REGISTRATION

BACKGROUND

The disclosure concerns a method for controlling a color printer or a color copier in which, with the aid of a printing unit, at least one color separation of a first color and a color separation of a second color are applied on a printing substrate to be printed to in order to generate a print image, and in which—with the aid of a control field printed by the printing unit of the color printer or, respectively, color copier—a control signal of a control is established to reduce the registration error between the color separation of the first color and the color separation of the second color.

Given multicolor printing, multiple color separations are printed atop one another on the printing substrate to generate the color image. In particular, four color separations are printed atop one another, namely cyan, yellow, magenta and black. In order to obtain a print image of high quality, it is necessary that the individual color separations are printed atop one another precisely as intended, since otherwise color deviations and/or blurring can occur. The deviations with which the individual color separations are printed relative to one another are designated as registration errors or register errors.

A known method to reduce registration errors is that control markings of the different colors of the color separations are printed in an edge region of the printing substrate and it is visually determined whether a registration error is present, and how large this is. The control of the printing unit is adapted accordingly. What is problematic in this method is that, due to the manual determination of the registration error, this can only take place in a quite imprecise manner, and a large expenditure is required for this.

In an alternative method, the printed control markings can be detected with the aid of an optical, high-resolution sensor, and the registration error can be determined from these automatically. In this case, the control of the printing unit is also thereupon adapted such that the registration error is reduced or, optimally, no registration error at all is present anymore. With this method it is problematic that expensive high-resolution optical sensors are necessary for this. These special sensors are also used exclusively to determine the registration error, and must be able to measure at various points over the print format.

Methods to determine registration errors are known from the documents DE 10 2009 035 006 A1, DE 102 44 437 B4, U.S. Pat. No. 7,396,099 B2, DE 101 31 957 A1, DE 10 2010 036 249 A1, US 2010/0007690 A1, U.S. Pat. No. 7,184,700 B2, DE 32 48 795 C2, EP 1 593 508 A2 and DE 197 38 992 A1, for example. A method to detect optical printing variables in multicolor production printing is known from the document DE 196 39 014 C2.

From the document DE 43 35 350 A1, a method is known for determining registration deviations given multicolor printing in which a REAL color value of a measurement field is determined and compared with a DESIRED color value. The desired color value is determined with the aid of an o.k. curve or with the aid of repro data. This has the disadvantage that the desired color value can only be calculated very imprecisely, and thus the registration control can likewise only take place in a very imprecise manner.

SUMMARY

It is an object to specify a method to control a color printer or color copier with the aid of which a multicolor print image can be generated in a simple manner with optimally few registration errors.

In a method to control a color printer or color copier, a color separation of a first color and a color separation of a second color are applied to a printing substrate to generate a print image. Also, with aid of a printing unit, at least a first control field is printed on the printing substrate. The first control field has a predetermined pattern that includes at least the first color and the second color and is designed such that a color value of the first control field changes depending on a registration error between the first and the second color separations. A reference field is also printed on the printing substrate, a pattern of the reference field being predetermined such that it has a same color value independent of the registration error. The color value of the first control field is measured with a color value sensor. The color value of the reference field is also measured with the color value sensor and a desired color value is determined depending on the color value of the reference field. A deviation between the measured color value of the first control field and the desired color value is determined, the deviation corresponding to a spatial shift of the color separations. At least one control signal is generated to reduce the spatial shift depending on the determined deviation.

BRIEF DESCRIPTION OF THE DRAWINGS

FIG. 2 is a plan view of a printing substrate to be printed to;

DESCRIPTION OF EXEMPLARY EMBODIMENTS

Figure 1:
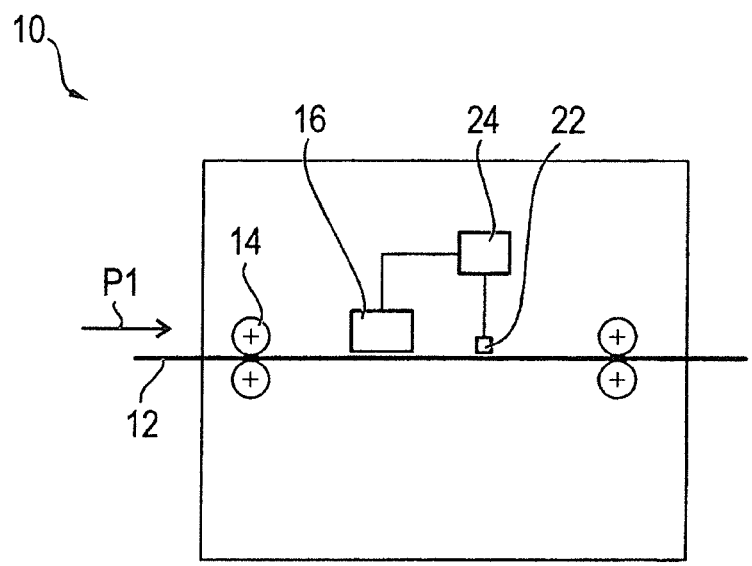
FIG. 1 is a schematic depiction of a printer.

For the purposes of promoting an understanding of the principles of the invention, reference will now be made to preferred exemplary embodiments/best mode illustrated in the drawings and specific language will be used to describe the same. It will nevertheless be understood that no limitation of the scope of the invention is thereby intended, and such alterations and further modifications in the illustrated embodiments and such further applications of the principles of the invention as illustrated as would normally occur to one skilled in the art to which the invention relates are included herein.

According to an exemplary embodiment, a control field that has a predetermined pattern which includes at least the first color and the second color is printed on the printing substrate to be printed to with the aid of the printing unit of the color copier or color printer. With the aid of a color value sensor, at least one color value of the control field is determined, and a deviation of the determined color value from a desired color value for the control field is subsequently determined. The pattern of the control field is designed such that the color value of the control field varies given a change of the registration error between the first color separation and the second color separation. To determine the desired color value, at least one reference field is printed whose pattern is predetermined such that it always has the same color value, independent of the registration error. The color value of the reference field is determined with the aid of the color value sensor and is used as a desired value for the comparison with the color value of the control field.

The control signal of the control to reduce the registration error between the color separations of the first and second color is established depending on this deviation between the desired color value determined via the reference field and the color value of the control field. It is hereby achieved that an in register print can be achieved via the corresponding control, without a sensor with a high optical resolution being required for this. The registration error is determined exclusively with the aid of the color value determined via the control field and its deviation from the desired color value, such that no additional sensor is necessary as given known methods to control the registration. It is not a sensor with spatial resolution that thus must be used but rather a color-resolving sensor. A color value sensor is present anyway in most color printers and color copiers in order to monitor the quality of the color printing. The control signal is also designated as a control variable in the following.

Via the determination of the desired value via the reference field, it is achieved that no theoretical calculation is necessary, and thus a particularly precise determination of the desired color value can take place.

The pattern of the reference field is in particular established such that it has the same color ratios of the first and second color as the pattern of the control field, such that the reference field and the control field have the same color value insofar as no registration error is present in the control field. The predetermined limit value is selected such that a typical maximum occurring registration error is smaller than this limit value, such that in regular operation the reference field always has the same color value (and thus always delivers the same desired value) depending on the actual registration error between the color separations of the first and second color.

The pattern of the reference field is in particular chosen such that the proportions of the reference field that are printed exclusively with the first color, the proportions that are printed exclusively with the second color and the proportions that are unprinted remain the same.

Alternatively, the pattern of the reference field can also be mirror-symmetrical to a middle line of the reference field. Furthermore, the pattern can also be made up of intersecting segments. The angle position is preferably 90°. The degree of coverage thereby does not change given occurrence of registration errors. Alternatively, large segments can also be printed in which registration shifts only have a slight effect on the degree of coverage.

An additional possibility is to print in the reference field a predetermined rasterization of the first color and a predetermined rasterization of the second color in superposition. The raster points of the two rasterizations partially overlap, wherein the proportions of the color superpositions can easily be determined via the different angulation of the rasterizations. The rasterizations are chosen such that the resulting proportions of the color superpositions in the reference field correspond to the corresponding proportions of the color superpositions in the control field if no registration error is present upon printing the control field. The degrees of areal coverage FD1 and FD2 are provided via the rasterizations of the first color and the second color. The proportion of the area of the reference field in which both colors are printed in superposition thus results as FD1*FD2; the proportion of the area in which only the first color is printed results as FD1−FD1*FD2; and the proportion of the area in which only the second color is printed results as FD2−FD1*FD2. The remainder of the reference field is unprinted.

In a preferred embodiment, two reference fields can also be used to determine the desired color value, wherein a first reference field has a predetermined rasterization of the first color and a second reference field has a predetermined rasterization of the second color. In particular, both the first color and the second color are printed on as full tone. The color value of the first and second reference field is respectively determined with the aid of the color value sensor, wherein the desired color value is calculated depending on the determined color values of the reference fields. In this way it is achieved that, via the reference fields, the reflection behavior (which depends on the colors used, the printing substrate and the settings of the printer) is taken into account in the theoretical calculation of the desired color value, such that said desired color value can be calculated with a high precision. In particular, a plurality of reference fields with different rasterizations of the respective colors is used, such that a particularly precise determination of the desired color value is possible.

In a preferred embodiment, a registration error between the color separation of the first and second color is initially determined depending on the deviation between the determined color value and the desired color value. Depending on the determined registration error, the control variable of the control for reducing the registration error is then established in turn, wherein this control variable is established such that the registration error is corrected or at least reduced. In an alternative embodiment, the control variable can also be established directly depending on the determined deviation, without the value of the registration error hereby being determined.

In a preferred embodiment, for at least one possible value of the registration error a desired color value is determined via a corresponding reference field, which desired color value the control field should have given the presence of this possible registration error. The deviation of the determined actual color value of the control field from this desired color value is subsequently determined, and the actual value of the registration error is determined depending on the determined deviation and the already previously determined deviation between the determined color value of the control field and the desired color value determined via the corresponding reference field. In a particularly preferred embodiment, for a plurality of possible values of the registration error the desired color value is respectively determined given the presence of this registration error, the deviation from the determined color value is respectively calculated. Depending on all determined deviations, the actual value of the reference error is determined, depending on which the control variable is in turn established. If multiple reference fields are printed in direct succession, it is to be assumed that the registration does not change.

In particular, it is hereby determined in which of the desired color values the smallest deviation from the determined color value exists, and the registration error that underlies this color value is assumed as an actual registration error. Alternatively, a fitted curve of the deviations can also be determined with the aid of the calculated desired color values, wherein the minimum of this fitted curve is subsequently determined, and the registration error underlying this minimum us used as an actual registration error.

The actual values of the registration error are in particular arranged symmetrically around an error of 0, thus an in-register print. The respective determination of the desired color value for the possible registration error can take place with the same methods as described in the preceding for the desired color value which this should have without the presence of a registration error.

The pattern of the control field is in particular not designed to be mirror-symmetrical so that—at least in a preset direction—the direction of the registration error can be determined via the change of the color value.

The pattern of the control field preferably has in alternating fashion a stripe of the first color, a stripe of the second color and an unprinted stripe. Given the use of white paper as a printing substrate, stripes of the first color, stripes of the second color and white stripes thus alternate. If a registration error occurs between the color separation of the first color and the color separation of the second color, depending on and in which direction the registration error occurs it occurs that at least a portion of the stripes of the two colors overlap, which leads to the situation that the control field produces a different color impression, which is expressed in the different measured color value. If a registration error is present in which the stripes of the second color are shifted in the direction of the white stripe, although the pattern changes the color value the portions that are exclusively with the first color, the portions that exclusively with the second color and the white portions of the control field remain unchanged.

In a preferred embodiment, the print image can also be made up of more than two color separations of different colors. The determination of the registration error or of the control variable to reduce the registration error of the additional colors can take place in the same manner as described previously for the first and second color. In particular, the control field, the pattern of the control field, the design of the reference field and the number of the control fields and reference fields that are used can be developed in the corresponding manner.

Additional features and advantages of an exemplary embodiment may be observed in the following description, which explains an exemplary embodiment in detail with the attached drawing figures.

A schematic, significantly simplified presentation of a full-color printer 10 for printing to a printing substrate 12 is shown in FIG. 1. Alternatively, it can also be a color copier. In the exemplary embodiment shown in FIG. 1, the printing substrate 12 is a paper web transported in the direction of the arrow P1 that is printed to with the aid of the color printer 10. Alternatively, page-shaped or sheet-shaped printing substrates can also be printed to.

Figure 2:
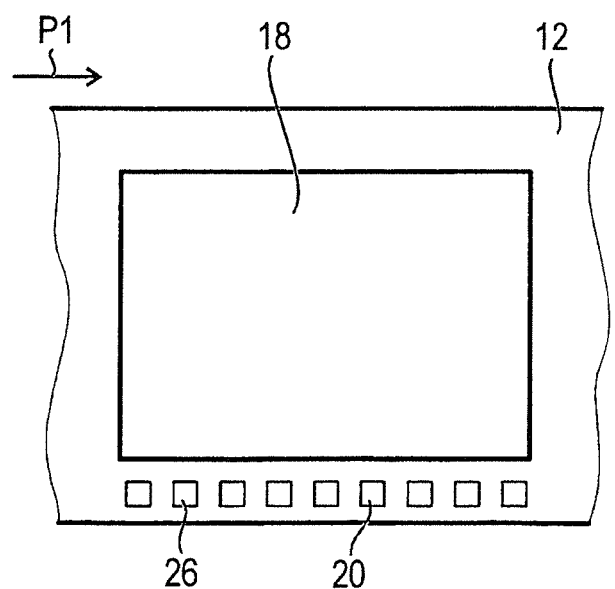

With the aid of transport elements 14, the printing substrate 12 is directed past a printing unit 16 with the aid of which ink, toner or printer's color is applied to the printing substrate 12 to generate a multicolor print image. The multicolor print image is hereby applied in particular such that multiple color separations are printed in superposition. The colors of the color separations are thereby applied over a full surface, in a raster or not at all depending on location, such that at different points the colors are printed next to one another or in arbitrary combination atop one another. In particular, four color separations are printed, namely a first color separation in black, a second color separation in yellow, a third color separation in cyan and a fourth color separation in magenta. A schematic plan view of the printing substrate 12 is shown in FIG. 2, wherein the print image generated with the aid of the printing unit 16 is designated with the reference character 18. In order to achieve a print image 18 of high quality, it is necessary that the differently colored color separations are printed atop one another in registration, meaning that they have a predetermined desired alignment relative to one another so that the individual color separations overlap properly and thus the desired colors result in the individual sub-regions of the print image 18. If the position of one color separation relative to the position of another color separation deviates from the predetermined relative alignment relative to one another (meaning that what is known as a registration error is present), it can thus be the case that a blurry print image 18 with color fringes is created.

At least one edge region of the printing substrate 12, multiple control fields (of which one is designated by way of example with the reference character 20) are printed by the printing unit 16 together with the print image 18. The control fields 20 serve for checking settings of the printer 10. According to the exemplary embodiment, at least one of the control fields 20 is used to determine the registration error between at least two color separations. For this, with the aid of the printing unit 16 a predetermined pattern of the control field 20 is printed as this is described in detail in connection with FIGS. 5 through 10. With the aid of a color value sensor 22, the color value of the control field 20 is determined integrally over the entire control field and is compared with a desired color value of the respective control field 20 which the control field 20 would need to have if no registration error was present. As is described later in connection with FIGS. 11 through 15, the desired color value is determined with the aid of a reference field whose pattern is designed such that the color value of the reference field is always independent of a possibly occurring registration error, and thus can serve as a desired color value. Depending on this determined deviation, a control unit 24 establishes at least one control variable of a control to reduce the registration error between at least two color separations. The establishment of the control variable can hereby take place directly depending on the determined deviation of the color value from the desired color value. Alternatively, the registration error can also be determined initially. The control variable is then established depending on the determined registration error. The control variable is hereby in particular established such that the registration error is corrected or at least reduced via the corresponding control.

Depending on the determined control variable, the control unit 25 in particular controls the printing unit 16 such that—given future generation of the print image 18—the registration error is at least reduced in that the alignment of the color separations relative to one another is changed accordingly. For this—for example given an inkjet printer—the point in time at which the ink is ejected from the nozzles is modified. Alternatively, the print image can be shifted pixel by pixel transverse to the printing direction in that the nozzles that are used are associated accordingly. The printing unit can likewise be shifted in a motorized manner. Given an electrographic printer, the latent image can also be shifted via the character generator.

The control field 20 in particular includes a pattern in which all colors of the color separations that are used to generate the print image 18 occur, and that is designed such that with its help the registration error of all color separations that are used relative to one another can be determined both along the transport direction and transverse to the transport direction P1. In an alternative embodiment, multiple control fields 20 can also be used with the aid of which the registration errors of the individual color separations relative to one another are determined. The patterns are designed such that—depending on registration errors due to different overlaps of the colors of the color separations—different color values of the control field 20 or of the control fields 20 result so that the registration error or registration errors can be determined via the deviation of the determined color value of the control field 20 or of the determined color values of the control fields 20 relative to the desired color value or the desired color values.

In particular, a tristimulus colorimeter or a spectral colorimeter is used as a color value sensor. With the aid of the color value sensor 22, the color value of the control field 20 is in particular determined as a coordinate of the Lab color space. The determination can hereby take place directly as a coordinate in Lab color space, or a reflection value and/or a coordinate in another color space can also initially be determined that is then converted into the coordinate of the Lab color space. In particular a brightness value, a value of a red-green axis or a value of a yellow-blue axis is thus determined as a color value. In an alternative embodiment, other color spaces can also be used in which the color values are determined. The use of the Lab color space has the advantage that a deviation of $\Delta E=1$ between two colors means that these two colors can just be differentiated by the human eye.

Alternatively, color density measurement devices or RGB sensors can be used as color value sensors.

Different methods can be used for the calculation of the desired color value of the control field 20. For example, the Neugebauer model can be used in which the colors in a raster print can be determined based on full tones of the color value. According to the model, the visually perceived color impression depends on the spectral reflection factors of the unprinted or printed paper, and on the proportion of the areas covered with the different colors of the color separations in the control field.

According to Neugebauer, the reflection of the area $R_R$ can be calculated according to the following formula from the degree of areal coverage F of the print color layer:

$$R_R = (1-F) \cdot R_P + F \cdot R_V,$$

wherein
$R_V$ is the reflection factor of the fully covered area,
$R_R$ is the reflection factor of the rastered area and
$R_P$ is the reflection factor of paper.

For the overlapping printing of multiple color layers, given multicolor printing with the colors C, M, K and Y (thus cyan, magenta, black and yellow), the formula thus results $$R_R = R_P^* (F_P + R_c^* F_c + R_M^* F_M + R_y^* F_y + \\ R_K^* F_K + R_{CM}^* F_{CM} + R_{CY}^* F_{CY} + R_{CK}^* F_{CK} + \\ R_{MY}^* F_{MY} + R_{MK}^* F_{MK} + R_{YK}^* F_{YK} + R_{CMY}^* F_{CMY} + \\ R_{CMK}^* F_{CMK} + R_{CYK}^* F_{CYK} + R_{MYK}^* F_{MYK} + \\ R_{CMYK}^* F_{CMYK}),$$

wherein R is the reflection factor of the respective layers (possibly printed in superposition) indicated in the index, and F is the degree of areal coverage that is associated with this.

The reflection factors R of the slices printed in superposition can thus be calculated via multiplication of the reflection factors of the individual layers. These must be calculated by dividing the reflection factor of the full tone on paper by the reflection factor of the unprinted paper in order to obtain values independent of the reflection properties of the paper. This is therefore most of all necessary since the reflection properties of the paper would otherwise be taken into account multiple times given overprinting.

The reflection factors of the full tones are in particular determined such that multiple reference fields 26 are printed on the printing substrate 12 in addition to the control field 20, wherein for each print color at least one reference field 26 is printed that has the full tone of this color, meaning that it is printed in its entirety with the respective color. With the aid of the color value sensor, from each of the reference fields 26 the color value is then respectively determined that thus delivers the color value of the respective full tone with the aid of which the desired color value for the control field 20 can be determined via the preceding Neugebauer formula, since—given the predetermined pattern of the control field 20—it is known which areal proportions of which color this pattern would ideally have if no registration error were present.

The reference fields 26 must be printed only once in the calibration of the printer 10, and their color values are measured. However, the reference fields 26 are normally continuously printed anyway during the printing operation for color regulation. In this case, it can also be reasonable to repeatedly measure the color value of the reference field 26 in the printing operation and to accordingly re-determine the desired color value in order to compensate for possible fluctuations. Alternatively, for the desired color value calculation stored reference values depending on the printing substrate types can also be resorted to for the desired color value calculation.

Via the preceding Neugebauer formula, an approximation is obtained for the spectral curves of arbitrary secondary colors from which the color values of the corresponding secondary colors can be calculated in turn according to specific methods, for example according to the ISO13655 standard.

Alternatively, other methods than the Neugebauer method can also be used for the calculation of the color values. For example, the Murray-Davis equation $$FMD = \frac{1 - 10^{-(D_R - D_P)}}{1 - 10^{-(D_V - D_P)}}$$

can be used for the calculation of the degree of areal coverage, wherein $D_V = -\log(R_V)$ and $D_R = -\log(R_R)$.

As an additional alternative method, the calculation of the color values can take place as is described in DE 197 01 967 C2.

After the desired color value of the control field has been calculated according to one of the methods cited in the preceding, or another method, the deviation of the determined color value from the desired color value ΔE will in particular be determined as a Euclidean distance, thus as $$\Delta E = \sqrt{(L_{ERM} - L_{DESIRED})^2 + (a_{ERM} - a_{DESIRED})^2) + (b_{ERM} - b_{DESIRED})^2}.$$

Different optimization steps (ΔEab, ΔE99, ΔE00) can be used as they are known from DIN 6174, DIN 6176 or CIE 15-2004. For color density measurements or measurements via RGB sensors, corresponding differentiation measures are to be used.

Figure 3:
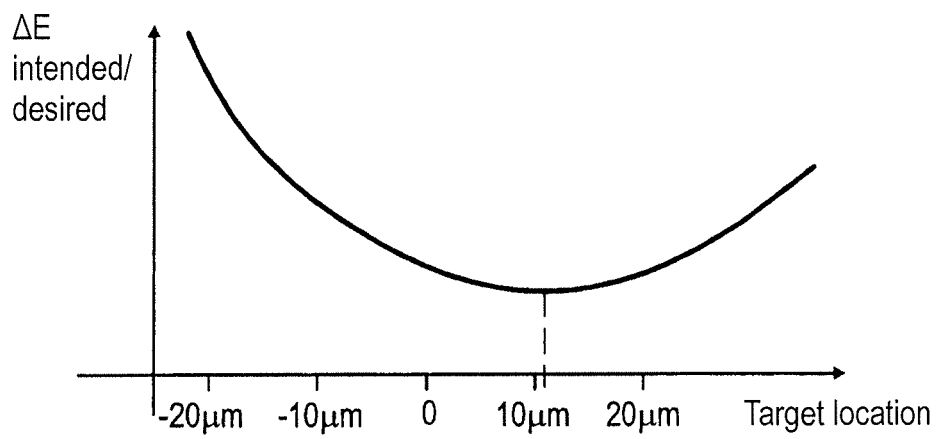
FIG. 3 is a diagram to determine the registration error with the aid of a determined color value deviation according to a first embodiment.

A diagram to determine the registration error between at least two color separations according to a first embodiment is shown in FIG. 3. According to this embodiment, a color value of the control field 20, a desired value for the in-register printing of the control field 20, and multiple desired values for predetermined possible registration errors are determined. The desired values are hereby in particular respectively calculated theoretically.

In FIG. 3, the respective assumed registration error is plotted on the X-axis, and that deviation that results between the determined color value of the control field 20 and the desired color value resulting given the respective assumed registration error is plotted on the Y-axis.

If no registration error were present, the curve resulting in this manner would need to have its minimum at the zero point (thus given an in-register printing) since, at this point, deviation of the determined color value from the desired color value would need to be smallest (ideally would need to have a value of zero). The remaining difference lies in color fluctuation, for example via inking variations or fixing variations.

If—in contrast to this—a registration error exists between the color separations of the print image 18, the minimum of the determined curve is not at the zero point but rather at that point at which the assumed registration error for calculation of the corresponding desired color value corresponds to that value of the registration error that now actually occurs.

According to the exemplary embodiment according to FIG. 3, a curve is thus initially determined (in particular via interpolation) using a plurality of determined desired color values and the respective deviation of the color value determined with the aid of the colorimeter 22 from these theoretical desired color values. The minimum of this curve is subsequently determined, and the registration error is determined in turn from this.

Figure 4:
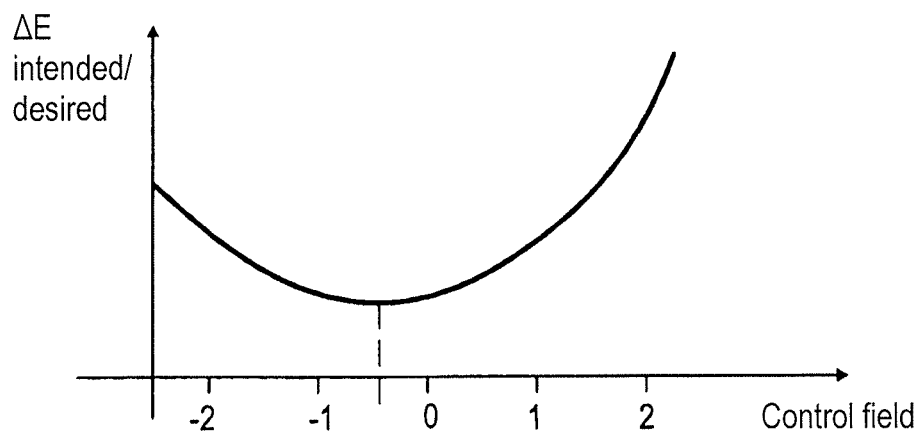
FIG. 4 is a diagram to determine the registration error with the aid of a determined color value deviation according to a second embodiment.

In FIG. 4, a diagram is shown for the determination of the registration error according to a second embodiment. In this second embodiment, only a desired value for the control field 20 is determined, namely the desired color value which the control field 20 would have given for in-register printing. In a second exemplary embodiment, multiple control fields 20 are printed on the printing substrate 12, wherein the control fields 20 respectively have the same pattern, wherein the color separations respectively are respectively printed offset from one another by different predetermined values given generation of this pattern in the individual control fields 20. The deviation of this determined color value from the desired color value is subsequently calculated and—as shown in FIG. 4—plotted against the respective predetermined deviation of the color separations in the respective control field 20.

From the values that thus result, a compensation function is applied with the aid of a compensation method. In particular, an interpolation method is used.

For the case that no registration error is present (thus given an in-registration printing) the curve that thus results has its minimum at the zero point, meaning that the deviation of the color of that control field 20 in which the color separations are printed without offset relative to one another from the calculated desired color value would be smallest. In contrast to this, if—as in the exemplary embodiment according to FIG. 4—a registration error is present, this leads to the situation that the predetermined deviation of the color separations in the individual control fields 20 is modified corresponding to the present registration error, and ideally the predetermined deviation due to the registration error is compensated precisely in this control field 20, such that in this control field 20 the pattern has precisely that color distribution that forms the basis of the calculated desired color value. The registration error can be determined via the determination of the minimum of the curve in FIG. 4 in that the deviation of the field of the minimum is multiplied by (−1).

In a further alternative embodiment, two control fields 20 can also be printed; and due to the patterns the two control fields 20 can also be mirror-symmetrical relative to one another. The color value is respectively determined from both of the control fields 20. The determination of the registration error can then take place such that the deviation of the two determined color values of the mirror-symmetrical control fields is minimized. Given in-register printing, both control fields 20 must have the same color value. If the control for printing with the difference color separations is now modified step by step given the presence of a color value deviation between the mirror-symmetrical control fields 20, and if two new mirror-symmetrical control fields 20 are respectively printed, in this way the printing can be optimized until a registration error is no longer present. The direction of the control in particular results via the comparison with the respective desired color value.

Alternatively, it is also possible that a test image is printed before the printing of the printing substrate 12 with the print image 18, which test image has a plurality of reference fields, wherein the reference fields respectively have different rasterizations of the different colors that are used. From each of the reference fields determined in such a manner, with the aid of the color value sensor 22 the desired color value is established so that overall a profile results which respectively associates the color values with the different rasterizations of the colors that are used. The registration error can thus be calculated with the aid of the predetermined color distributions of the predetermined pattern of the control field 20 and the color value of the control field 20 that is determined via the color value sensor 22. Upon printing to the printing substrate 12 with the test image, in particular the same printing settings of the printing 10 are used as are used later in the printing with the print image 18.

In a further alternative embodiment, the desired color value of the control field 20 can also be calculated not from multiple reference fields 26 but rather via a single reference field 26 with the aid of the color value sensor 22. For this, this additionally applied reference field 26 has a pattern that is designed such that it always yields the same color value (namely the desired color value) up to a predetermined limit value of the registration error, independent of the present registration error. For this, the additionally applied reference field 26 in particular has the same areal proportions of the respective colors as the pattern of the control field 20, wherein—in contrast to the pattern of the control field 20—the colors (insofar as the actually present registration error does not exceed the preset limit value) are plotted to be so far distant from one another that, although the individual colors can overlap, the proportions of the individual colors and the superimposed colors in the reference field 26 always remain constant in spite of shifts due to a registration error. The same color value thus also results independently of the present registration error.

Figure 11:
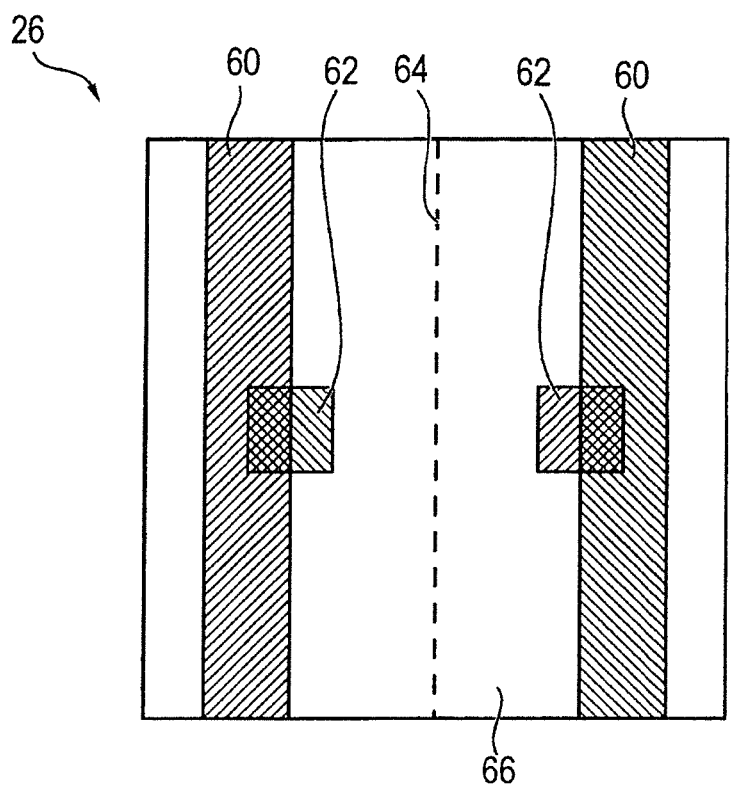
FIG. 11 is a schematic depiction of a reference field to determine the desired color value according to a first embodiment.

In FIG. 11, such a registration-independent reference field 26 is shown according to a first embodiment. In this first embodiment, the differently colored segments 60, 62 are arranged mirror-symmetrically relative to a middle axis 64 of the reference field 26, such that—independent of the present registration error—the different-colored segments 60, 62 respectively superimpose to the same degree as considered over the entire reference field 26. Furthermore, the unprinted parts 66 of the reference field 26 also remain constant, such that the determined integral color value of the reference field 26 is also independent of the actual present registration error. The reference field 26 is in particular designed such that this resulting desired color value coincides with the color value of the control field 20 if no registration error is present in the control field 20. In particular, for this the same colors are used for the segments 60, 62 of the reference field 26 as for the segments of the control field 20, wherein the respective area proportions of the individual color segments and of the overlaps or the unprinted regions in the reference field 26 and the in-register control field 20 are the same.

Figure 12:
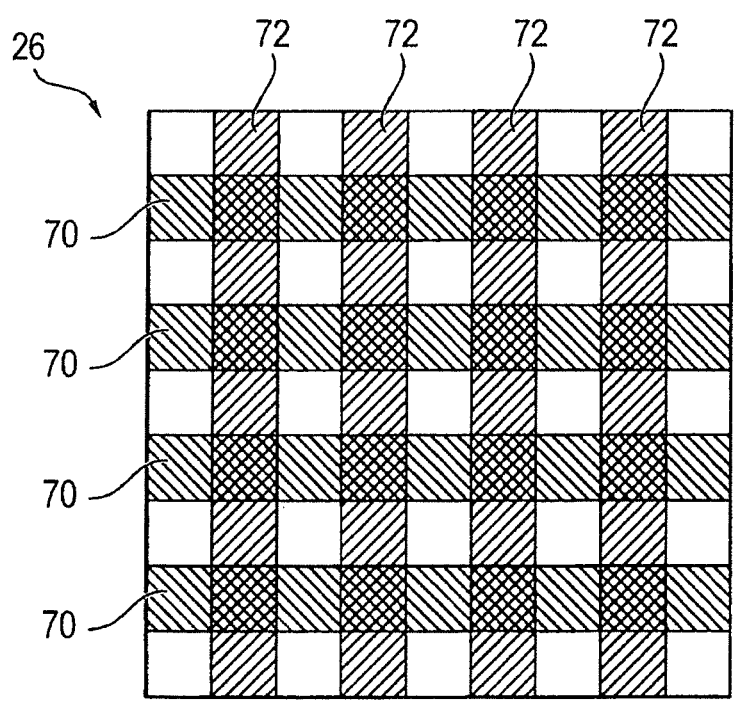
FIG. 12 is a schematic depiction of a reference field to determine the desired color value according to a second embodiment.

In FIG. 12, a reference field 26 is shown according to a second embodiment which likewise supplies the same color value as a desired color value, independently of the occurring registration error. For this, the reference field 26 has a pattern that is made up of intersecting—in particular orthogonally intersecting—segments 70, 72 of different colors. Given this pattern it is also the case that the proportions of the pure colors, the proportions of the overlaps and the proportions of the uninked regions remain constant.

Figure 13:
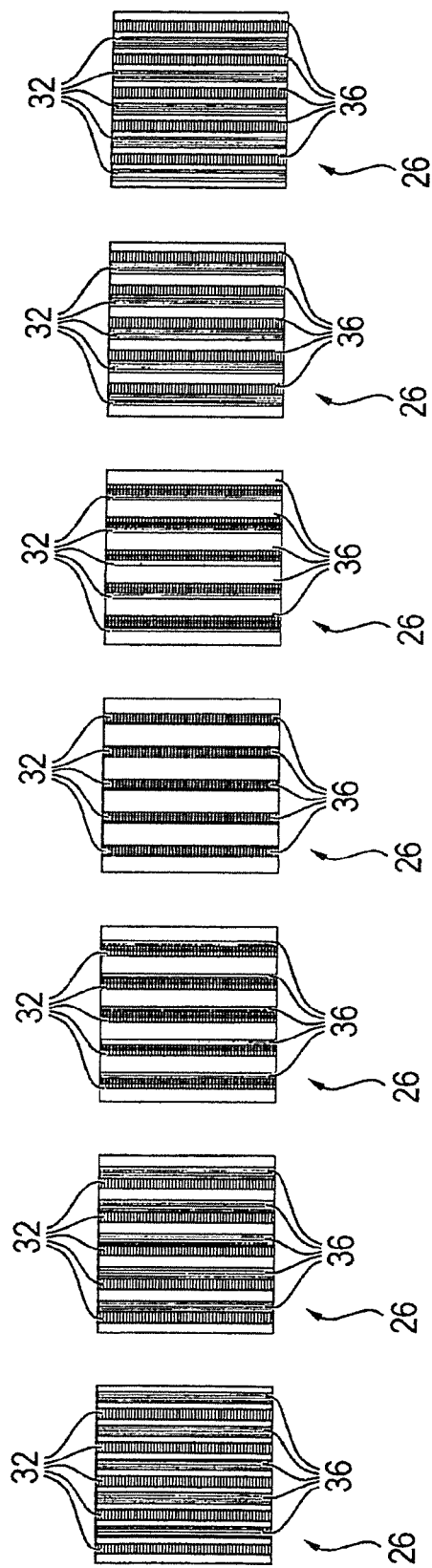
FIG. 13 is a schematic depiction of multiple reference fields to determine the desired color value according to a third embodiment.

A schematic presentation of multiple reference fields 26 according to a third embodiment is shown in FIG. 13. A plurality of reference fields 26 is hereby printed to determine the desired color value, wherein the reference fields 26 respectively have in alternation cyan-colored stripes 32, magenta-colored stripes 36 and unprinted stripes, wherein the cyan-colored stripes 62 and the magenta-colored stripes 36 are printed with a different offset relative to one another from reference field to reference field 26 and thus largely overlap differently. The color value is determined from each of the reference fields 26 with the aid of the color value sensor 22. Independent of the registration error that is actually present, the desired color value can now be determined simply either as one of the extreme values of the determined color values or via an averaging from the two determined extreme values. Independent of the registration error, in one of the reference fields 26 a complete overlap of the stripes 32, 36 takes place, and in one of the reference fields 26 a printing of the stripes 32, 36 entirely side by side takes place, such that the desired color value can be determined via these values.

If multiple reference fields 26 are printed in direct succession, it is to be assumed that the registration error hereby does not significantly change, and this thus has no influence.

Figure 15:
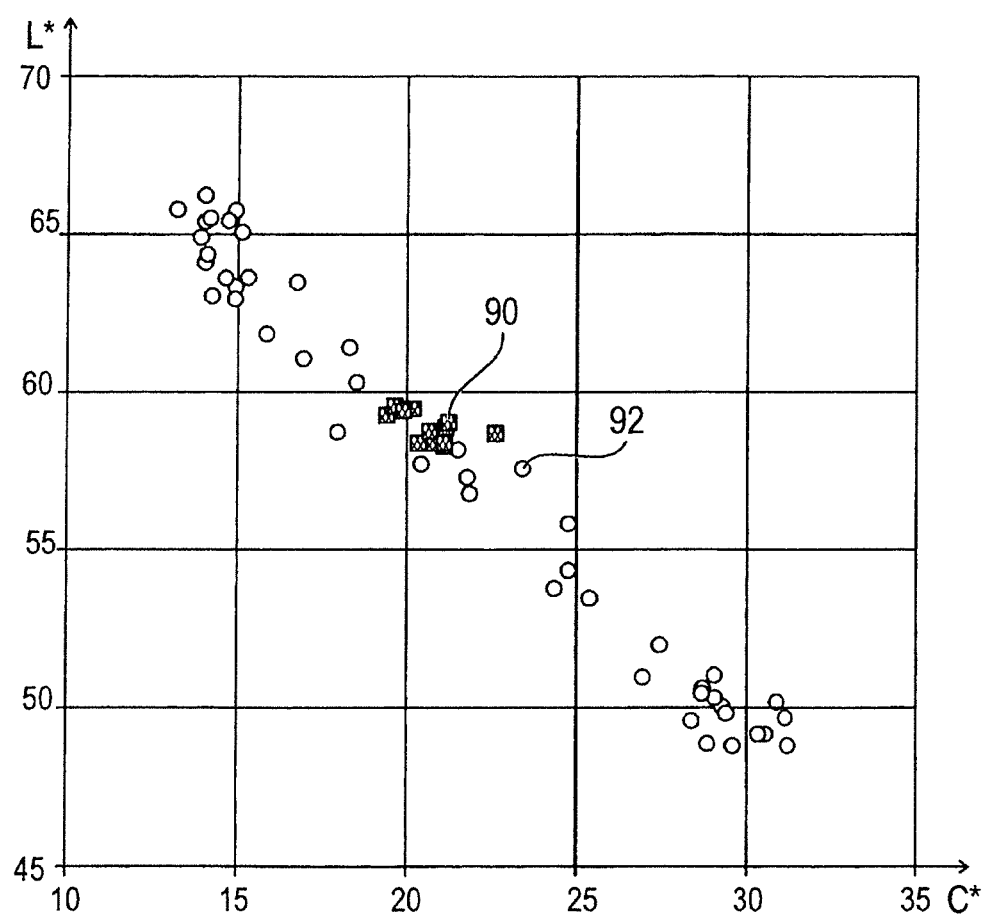
FIG. 15 is a diagram of a measurement series of a reference field and a control field given different registration errors.

Shown in FIG. 15 is a diagram of experimentally determined color values of a crisscrossed reference field 26 from FIG. 12 and a control field 20 with parallel stripes of the same colors as the reference field 26 given different registration errors. The chroma C* is hereby plotted on the x-axis and the brightness L* is plotted on the y-axis. The measurement values of the crisscrossed reference field 26 are hereby represented by the squares 90. The measurement values of the striped control field 20 are represented by the circles 92.

Figure 5:
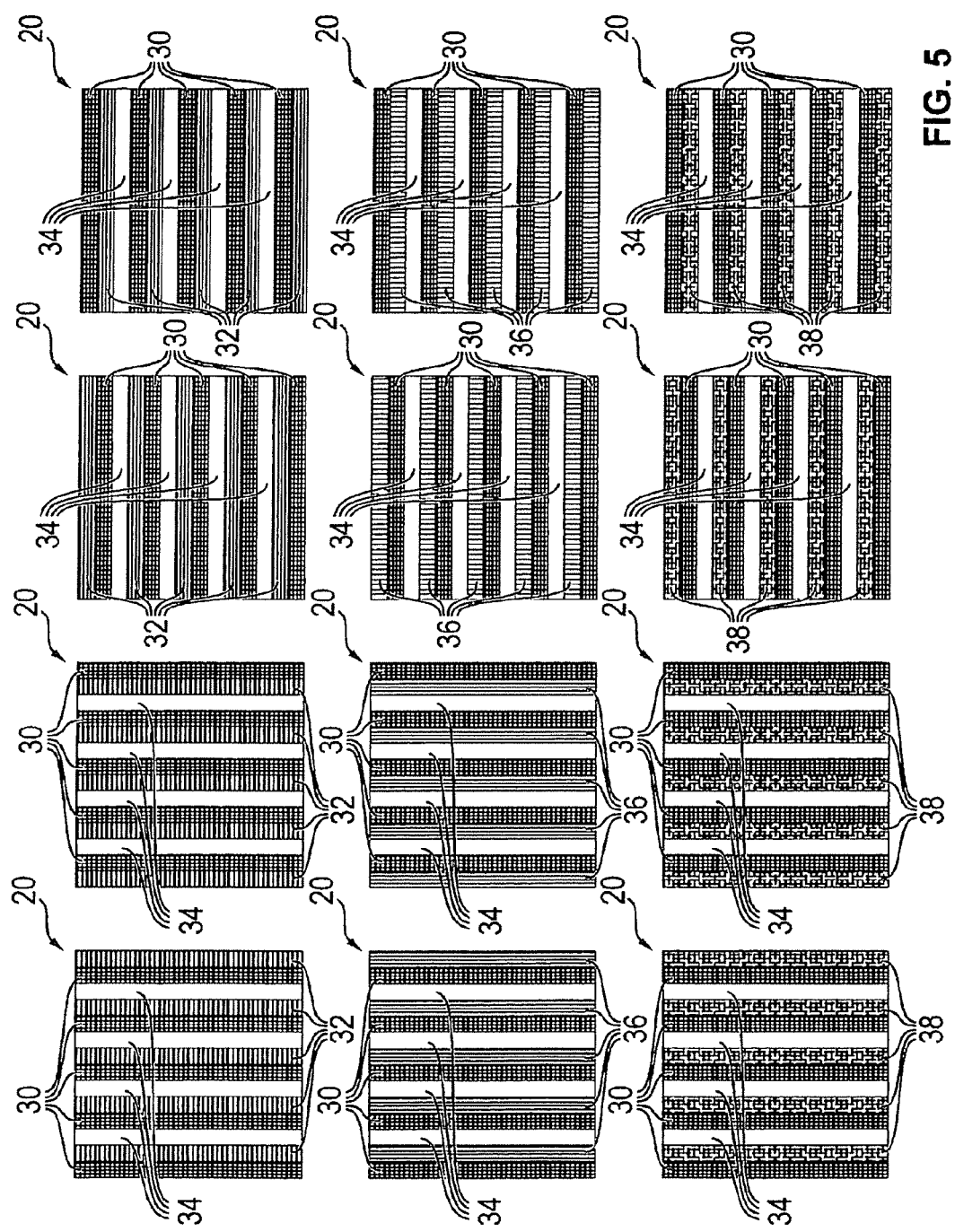
FIG. 5 is a schematic depiction of control fields to determine the registration error according to a first embodiment.

As is easily learned from the diagram, the crisscrossed reference field 26 using in the experiment has approximately the same chroma C* and the same brightness L*, independently of the present registration error. For the striped control field 20—for example as this is shown in FIG. 5—the determined measurement values markedly fluctuate between two extremes, wherein one extreme represents the complete overlapping of the different-colored stripes and the other extreme represents the completely parallel situation of the different-colored stripes. In the example, a deviation ΔE=25 results between these two extremes. Given the crisscrossed reference field 20, the deviation exists only at ΔE=1. Registration errors up to 500 μm can thus be detected. The precision can be even further increased via the use of smaller segments in the reference fields 20 or control fields 26.

A schematic depiction of control fields 20 according to a first embodiment is shown in FIG. 5. In this first embodiment, twelve control fields are used relative to one another to determine the registration error of all four primary colors that are used in full color printing, wherein the corresponding reference error relative to black is determined respectively for cyan, magenta and yellow. For each color, four control fields 20 are hereby provided, wherein the pattern of two of the control fields 20 is respectively mirror-symmetrical, and the patterns of the other two control fields 20 are arranged rotated by 90° relative to the first two control fields 20.

The control fields 20 respectively comprise in alternating fashion: black stripes 30; a stripe 32, 36, 38 printed with the respective color; and unprinted stripes 34; wherein the stripes 30, 32, 34, 36, 38, in particular respectively have the same width and the same length.

The twelve control fields 20 shown in FIG. 5 respectively show the ideal pattern if no registration error is present. In the following, what would happen given the occurrence of a registration error is described relative to the first control field, i.e. the control field that is shown to the upper left in FIG. 5.

If a registration error occurs between the black color separation and the cyan color separation such that the cyan color separation is printed offset to the left relative to the black color separation, the cyan stripes 32 migrate into the black stripes 30 so that the proportion of black-inked area of the control field remains the same, the proportion of the cyan-inked area is reduced and the proportion of the unprinted area (thus the white area) is greater. A different color value thus results for the control field 20, integrated over the entire area, wherein a different color value respectively results for different registration errors. It is thus possible to determine the registration error via the determined deviation of the determined color value from the desired color value.

In contrast to this, if a registration error occurs such that the cyan color separation deviates to right of the desired position relative to the black color separation, the color proportions of both the black-inked area and of the cyan-inked areas, and of the unprinted area, thus remain unchanged in the first control field insofar as the registration error does not exceed the width of the stripes 30 through 34.

Only a registration error in a predetermined direction (to the left in the shown exemplary embodiment) can thus be determined with the aid of the first control field.

Via the mirror-symmetrical arrangement of the pattern in the second control field (thus the control field in the first row, the second from the left) it is achieved that a registration error in the second direction opposite the first direction (thus a registration error to the right) can be determined with this control field. A registration error that is directed orthogonal to the first direction or orthogonal to the second direction—thus a registration error upward or downward in FIG. 5—can be determined neither with the first control field nor with the second control field. Via rotation of the pattern in the third and fourth control field by 90° compared to the two additional control fields in the first row it is achieved that the registration error can be determined in any arbitrary direction in the plane of the paper via the four control fields.

The other eight control fields are provided for the corresponding determination of the registration errors of the other two colors, thus for magenta and yellow relative to black. Thus, these additional eight control fields respectively have the same pattern, are mirrored and are rotated accordingly.

Figure 6:
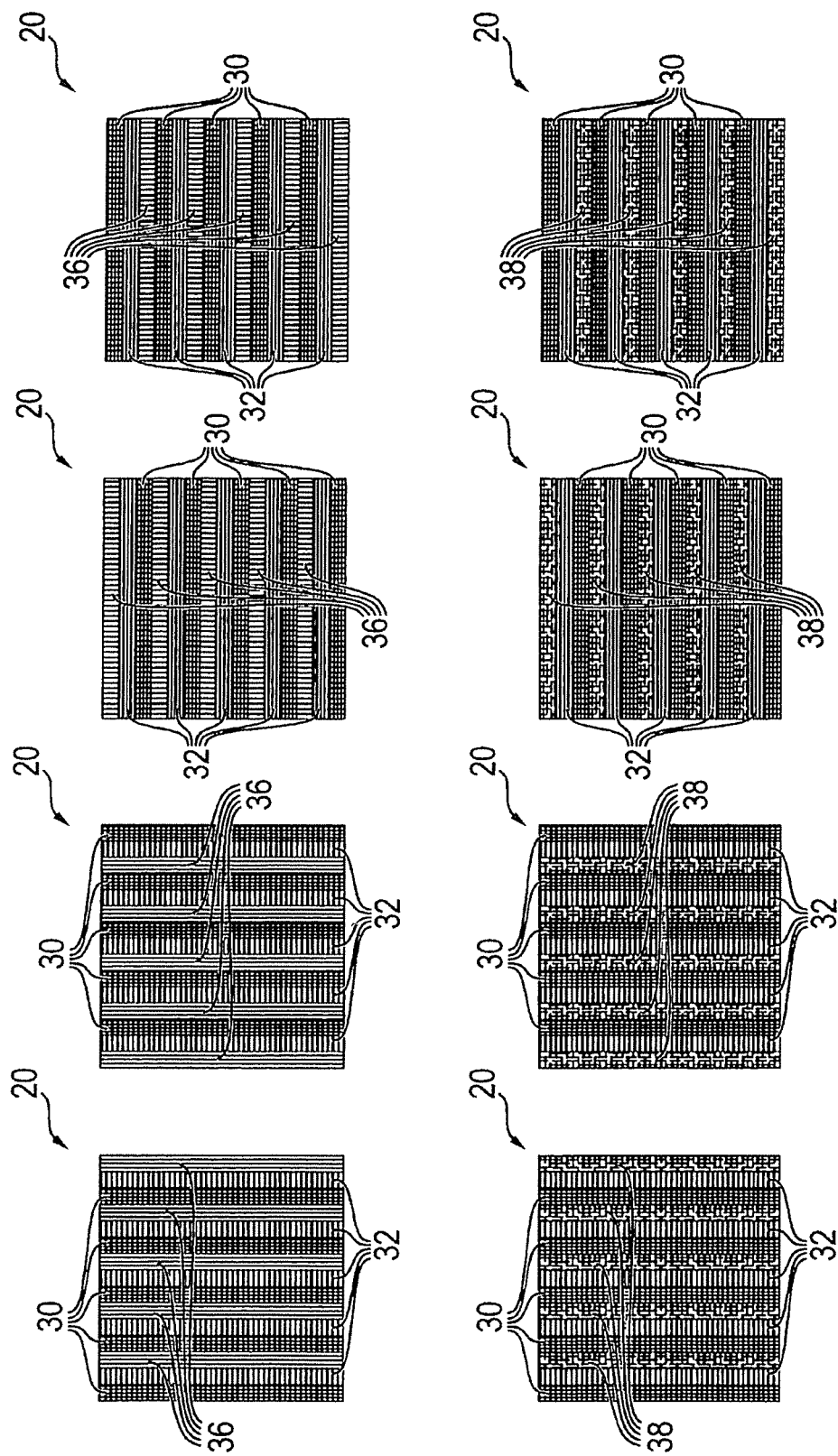
FIG. 6 is a schematic depiction of control fields to determine the registration error according to a second embodiment.

A schematic depiction of the control fields 20 according to the second embodiment of the exemplary embodiment is shown in FIG. 6. In this embodiment, only eight control fields 20 are necessary for the determination of the registration error of all four colors relative to one another. For this, the stripes 34 that are not printed in the first embodiment are also respectively printed with an additional color. In the selected exemplary embodiment in FIG. 6, each pattern thus includes in alternation black stripes 30, cyan stripes 32 and either magenta stripes 36 or yellow stripes 38. Depending on in which direction which color separation exhibit a registration error, different colors result via the overlapping of the individual stripes 30, 32, 36, 38, and thus also different resulting color values of the control fields 20. For example, if a registration error of the cyan color separation to the left occurs given the control field to the upper left, the proportion of the areas that appear black and magenta remains the same, wherein the proportion of the areas appearing cyan-colored decreases and the proportion of the unprinted areas increases. In contrast to this, if the cyan color separation is shifted to the right, the black inked areas remain the same, in contrast to which the proportion of the cyan areas and of the magenta areas decreases and the proportion of the unprinted areas and blue areas increases.

Figure 7:
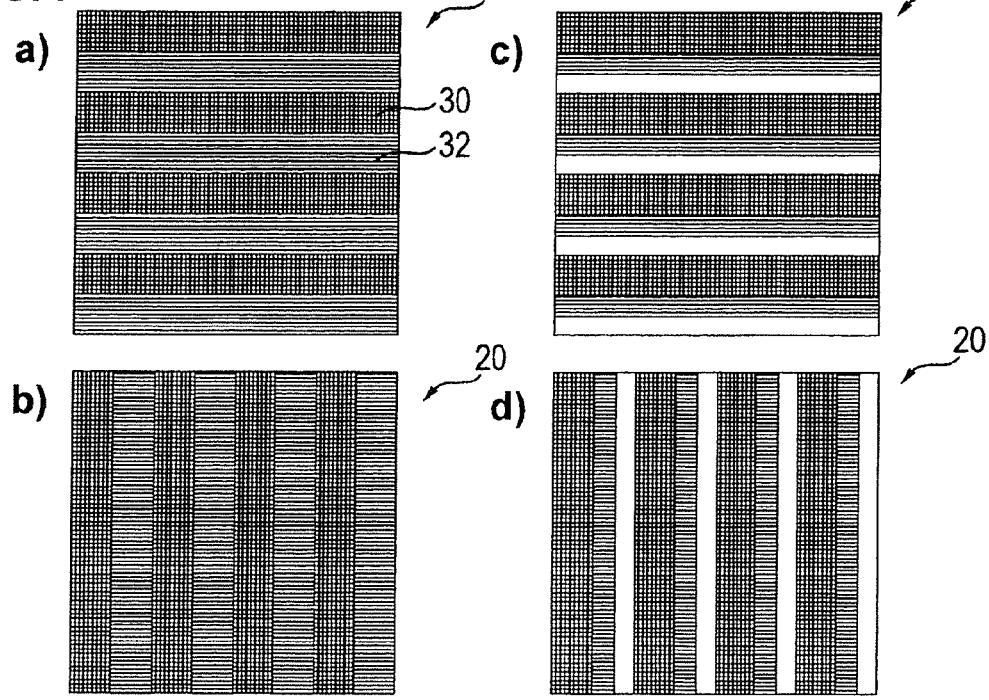
FIG. 7 is a schematic depiction of control fields to determine the registration error according to a third embodiment.

A schematic depiction of four control fields 20 according to a third embodiment is shown in FIG. 7, wherein in this embodiment only the registration error between black and cyan is determined. FIGS. 7a and 7b hereby show two control fields 20 if no registration error is present. The control fields 20 respectively have black and cyan stripes 30, 32 in alternating fashion, wherein the pattern of the control field 20 according to FIG. 7b is rotated by 90° relative to the pattern of the control field 20 from FIG. 7a. FIG. 7c shows the resulting pattern if the cyan color separation is shifted upward given the control field 20 according to FIG. 7a. FIG. 7d accordingly shows the control field 20 according to FIG. 7b given the presence of a registration error in which the cyan color separation is shifted to the left relative to the black color separation. In FIGS. 7c and 7d, the magnitude of the registration error corresponds to the width of the white fields.

Figure 8:
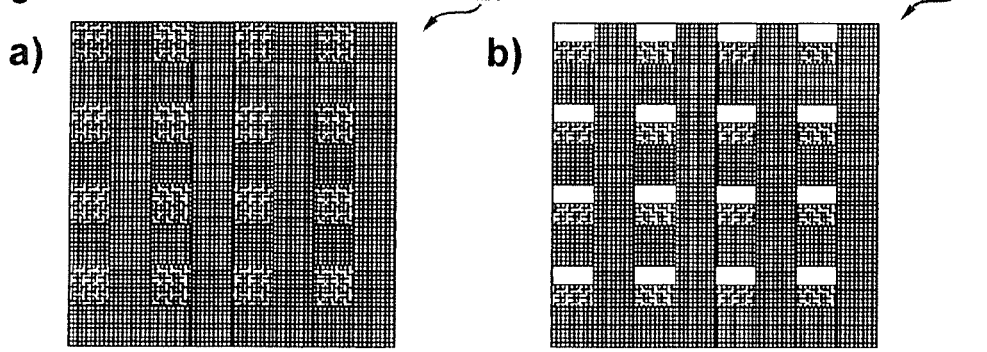
FIG. 8 is a schematic depiction of control fields to determine the registration error according to a fourth embodiment.

Two control fields 20 according to a fourth embodiment are shown in FIG. 8, wherein FIG. 8a shows the control field 20 given an in-register printing, and FIG. 8b shows the control field 20 given the presence of a registration error.

The control field 20 according to FIG. 8a has a pattern in which stripes that are inked completely in black and stripes that respectively have yellow and black squares in alternating fashion are respectively arranged in alternating fashion. In FIG. 8, the resulting pattern is shown that results given a registration error in which the yellow color separation is arranged offset downward relative to the black color separation. The yellow proportion decreases due to this registration error, in contrast to which the unprinted (thus white) proportion increases. The black proportion remains unchanged. A different color value accordingly results.

Figure 9:
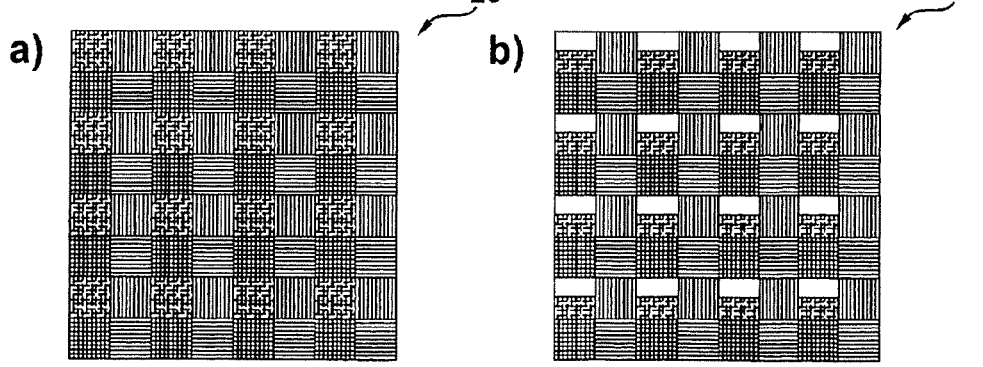
FIG. 9 is a schematic depiction of control fields to determine the registration error according to a fifth embodiment.

In FIG. 9, two control fields 20 according to a fifth embodiment are shown, wherein respectively the printing in register is shown again in FIG. 9a, and in FIG. 9b the pattern is shown that results given a registration error in which the yellow color separation is arranged offset downward relative to the other three color separations.

The control field 20 according to FIG. 9a has a checkerboard pattern, wherein the respective lines have yellow and magenta squares or black and cyan squares in alternating fashion. The use of such a checkerboard pattern has the advantage that fewer control fields are necessary to determine all registration errors of all color separations relative to one another since—depending on in which direction which color separation is shifted relative to the others—different colors result via the superposition of the individual color separations, and thus a different color value results.

Figure 10:
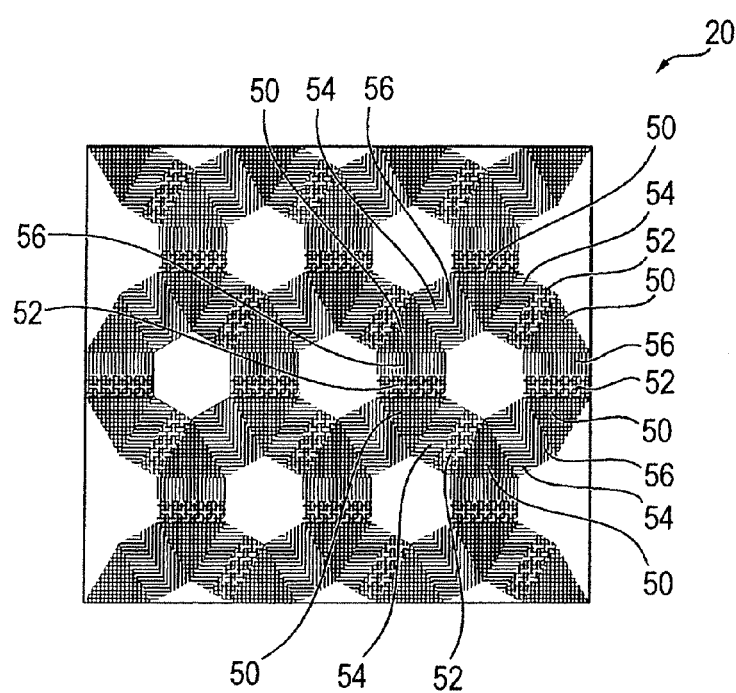
FIG. 10 is a schematic depiction of a control field to determine the registration error according to a sixth embodiment.

A schematic depiction of a control field 20 according to a sixth embodiment is shown in FIG. 10, wherein given this sixth embodiment the control field 20 has a pattern in which the four print colors that are used are arranged such that all registration errors in all directions can be determined with the aid of only this one control field 20. For this, the colors are arranged such that a different color value of the control field 20 results depending on in which direction which color separation is arranged offset relative to which other color separation.

The pattern according to FIG. 10 has a plurality of annular dodecagons, wherein each dodecagon in turn has six black-inked triangles 50 whose points are directed towards the middle point of the dodecagon. The triangles 50 are in particular equilateral triangles and respectively have the same angular separation relative to one another. Two colored stripes 53 through 56 are respectively arranged between the black triangles 50, wherein on the one hand a yellow stripe 52 and a cyan stripe 54 and a yellow stripe 52 and magenta stripes 54, as well as a magenta stripe 56 and a cyan stripe 54, are respectively arranged in alternating fashion between two adjacent black triangles 50.

Moreover, a plurality of additional possible patterns for the control fields 20 are conceivable. Depending on the pattern that is used, the number of necessary control fields 20 varies in order to be able to determine all conceivable registration errors.

In an alternative embodiment, multiple control fields 20 can also be used in which the patterns are selected such that they respectively have the same color ratios of the different colors but have a different number of stripes of different width. Insofar as stripes with a large spacing from one another are used—meaning that a large unprinted space is between them—the color composition of the control field 20 also does not change given occurrence of a small registration error, such that the color value remains unchanged. Given control fields 20 with relatively small spacing, in contrast to this a superposition of the stripes occurs already given a small registration error, such that the color value of the control field 20 changes. The present registration error can accordingly be determined in turn via the color values.

With the aid of the previously described method, the registration error can be determined with high precision exclusively via the color values, even given the presence of only a small registration error. This has the advantage that no additional sensors are necessary. This has the advantage that no additional sensors are necessary. In particular, no sensors are necessary that supply high spatially resolved images of the control fields 20 in which the deviation is then measured. The color value sensors 22 are normally already present anyway in color printers 10. Such color value sensors 22 are also cost-effective compared with high-resolution sensors, and require only a small structural space. In particular, it is not necessary to use multiple sensors for the color measurement on the one hand, and for the registration control on the other hand. In particular, a high measurement precision thus also results.

The method also has the advantage that the control fields 20 are compatible with the control fields that are used anyway since they can have the same size, and likewise can be printed as well at the edge region. An adaptation to any arbitrary registration error can take place via the variation of the size of the individual regions of the pattern of the control field 20, such that a scalability is possible in a simple manner.

A test by the applicant with an electrophotographic printer and the colors cyan and magenta resulted in a color value deviation between the completely parallel printing of the two colors and the complete overprinting of the two colors of $\Delta E=27$. The color difference is so large that even a partial overlap of, for example, 5% could be detected with certainty. Depending on the size of the control field 20, a registration error of 5% of the width of the different-colored stripes of the pattern of the control field 20 can thus be determined. Given 0.5 mm stripe width, a registration error of 25 μm can thus be detected. Commercially available colorimeters 22 typically have a repetition precision significantly better than 1 $\Delta E$. The measurement precision is sufficient for a differentiation of different degrees of coverage.

In particular, the stripe width is in particular selected such that the maximum occurring registration error is less than this stripe width. If the maximum occurring registration error should be larger than the stripe width, the registration error can thus not be precisely determined. In this case, stripes with a larger width can be used.

In a particularly preferred embodiment, upon startup of the color printer 10 a pattern for the control field 20 with wide stripes can initially be used, and the stripe width is increasingly reduced in operation. It is also possible to modify the pattern of the control field 20 that is used, or the number of control fields 20 that are used in the printing operation, depending on the occurring registration error. In particular, initially only a control field 20 with all colors that are used is utilized, and additional control fields 20 are only printed upon occurrence of registration errors or, respectively, upon exceeding preset limit values of the registration error, with the aid of which additional control fields 20 the direction of the registration error is determined and/or with the aid of which a more precise determination of the registration error is possible.

Figure 14:
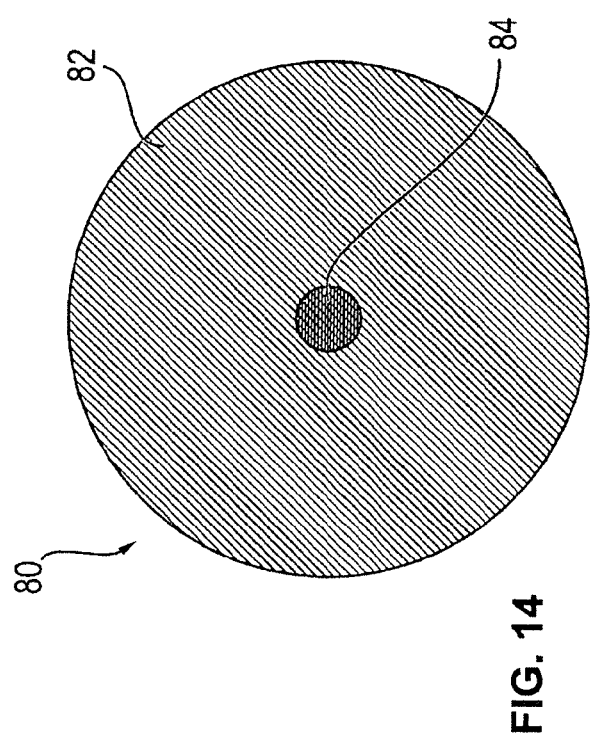
FIG. 14 is a schematic depiction of a monitoring field.

In a further embodiment, control fields 20 and reference fields 26 can also be printed only until a registration error no longer exists or, respectively, until this is within tolerable limits. To reduce the cost—and in particular to reduce the ink to be applied, the toner or the print color to be applied— only monitoring fields 80 of simple design are then initially printed instead of control fields 20 and reference fields 26. Such a monitoring field is shown in FIG. 14. The monitoring field 80 includes a large circle 82 of a first color and a significantly smaller circle 84 of a second color. If no registration error exists between the color separations of these two colors, the middle points of the two circles 82, 84 coincide. In contrast to this, given the presence of a registration error the small circle wanders relative to the large circle, wherein the small circle 84 remains in the large circle 82 until the registration error is larger than the difference of the two radii of the two circles 82, 84. As long as the small circle 84 is arranged entirely within the large circle 82, the color value of this monitoring field 80 does not change. The radii are chosen such that—as long as this is the case—the registration error is within a tolerable degree. Only if the registration error exceeds the tolerable measure—and thus only if the color value of the monitoring value 80 changes— are control fields 20 and reference fields printed again instead of the monitoring field 80, and the registration errors are corrected according to the method described in the preceding.

The measurement region of the color sensor 22 is in particular chosen such that this is smaller than the size of the control fields 20 or of the reference fields 26 or of the monitoring field 80, such that—even given the presence of registration errors—it is ensured that the region covered by the measurement region of the color sensor 22 is independent of the registration error, and thus the error has no influence on the measurement itself.

The width of the measurement region is in particular a multiple of the width of the stripes or segments of the control fields 20.

Any manner of positioning of the individual colors of the color separations relative to one another—also of the color separations from the front side and back side of the printing substrate relative to one another—is understood as a registration Although preferred exemplary embodiments are shown and described in detail in the drawings and in the preceding specification, they should be viewed as purely exemplary and not as limiting the invention. It is noted that only preferred exemplary embodiments are shown and described, and all variations and modifications that presently or in the future lie within the protective scope of the invention should be protected.

I claim as my invention:

1. A method to control a color printer or color copier, comprising the steps of:
    applying a color separation of a first color and a color separation of a second color to a printing substrate to be printed to in order to generate a print image;
    also, with aid of a printing unit, printing at least a first control field on the printing substrate, wherein the first control field has a predetermined pattern that includes at least the first color and the second color and is designed such that a color value of the first control field changes depending on a registration error between the first and the second color separations;
    also printing a reference field on the same printing substrate, the reference field having a predetermined pattern including at least the first color and the second color, wherein the pattern of the reference field is designed such that a degree of superposition of the first and the second colors of the pattern of said reference field remains constant independent of the registration error such that the pattern of the reference field has a same color value independent of the registration error;

measuring the color value of the first control field with aid of a color value sensor;

also measuring the color value of the reference field with aid of the color value sensor and determining a desired color value depending on the color value of the reference field;

determining a deviation between the measured color value of the first control field and the desired color value, the deviation corresponding to a spatial shift of the color separations; and generating at least one control signal to reduce said spatial shift of the color separations depending on the determined deviation.

2. The method according to claim 1 wherein the deviation between the determined color value and the desired color value is determined as a Euclidean distance.

3. The method according to claim 1 wherein: a second control field is printed on the printing substrate, wherein in the second control field regions inked with the first color are arranged in the pattern of the first control field, and regions inked with the second color are shifted relative to the regions of the first color by a preset value in a preset direction; a color value of the second control field is determined with aid of the color value sensor; a deviation between the desired color value and the determined color value of the second control field is determined; and the control signal is established depending on a deviation between the determined color value of the first control field and the desired color value and a deviation between the determined color value of the second control field and the desired color value.

4. The method according to claim 3 wherein: a pattern of the second control field is mirror-symmetrical relative to a pattern of the first control field; with aid of the color value sensor a respective color value of the second control field is measured; a respective deviation of the color value of the second control field from the desired color value is determined; and the control signal is established depending on the deviation of the determined color value of the first control field and the determined deviation of the determined color valve of the second control field.

5. The method according to claim 3 wherein: a color separation of a third color is applied on the printing substrate to be printed to in order to generate the print image; with the aid of the printing unit, at least another control field is printed on the printing substrate, wherein the another control field has a predetermined pattern that includes the first color and the third color; a color value of the another control field is measured with aid of the color value sensor; a deviation between the measured color value of the another control field and the desired color value is determined; and another control signal to reduce a registration error between the color separation of the first color and the color separation of the third color is established depending on said determined deviation of the determined color value of the another control field from the desired color value.

6. The method according to claim 1 wherein the pattern of the first control field respectively has in alternating fashion a stripe of the first color, a stripe of the second color, and an unprinted stripe.

7. The method according to claim 1 wherein: a color separation of a third color is applied on a printing substrate to be printed to in order to generate the print image; a pattern of the first control field includes the third color; and depending on a determined deviation, a control value of a control signal to reduce a registration error between the color separation of the first color and the color separation of the second color is established, and a control value to reduce a registration error between the color separation of the first color and the color separation of the third color is established.

8. The method according to claim 1 wherein the color value of the reference field that is measured with aid of the color value sensor is used as said desired color value.

9. The method according to claim 1 wherein the desired color value is calculated on the basis of the color value of the reference field that is measured with aid of the color value sensor.

10. The method according to claim 1 wherein the pattern of the reference field is designed such that the degree of superposition of the first and the second colors of the pattern of said reference field remains constant independent of a spatial shift of the first and the second colors of the pattern of said reference field.

11. The method according to claim 1 wherein the pattern of the reference field further includes unprinted portions, wherein a proportion of the unprinted portions of the pattern of the reference field remains constant independent of the registration error such that the pattern of the reference field has the same color value independent of the registration error.

12. The method according to claim 1 wherein proportions of segments of the first color of the pattern of the reference field, segments of the second color of the pattern of the reference field, segments of unprinted portions of the pattern of the reference field, and segments of overlapping portions of the first and second colors of the pattern of the reference field remain constant independent of the registration error such that the pattern of the reference field has the same color value independent of the registration error.

13. The method according to claim 1 wherein proportions of segments of the first color of the pattern of the reference field, segments of the second color of the pattern of the reference field, and segments of overlapping portions of the first and second colors of the pattern of the reference field remain constant independent of the registration error such that the pattern of the reference field has the same color value independent of the registration error.

14. The method according to claim 1 wherein:
the pattern of the reference field comprises first and second segments of the first color and first and second segments of the second color;
the first and the second segments of the first color are symmetrically positioned with respect to an axis;
the first and the second segments of the second color are symmetrically positioned with respect to the axis;
the first segment of the first color overlaps the first segment of the second color and the second segment of the first color overlaps the second segment of the second color; and
a degree of superposition of the first segments and a degree of superposition of the second segments remain constant independent of the registration error such that the pattern of the reference field has the same color value independent of the registration error.

15. A method to control a color printer or color copier, comprising the steps of:
applying a color separation of a first color and a color separation of a second color to a printing substrate to be printed to in order to generate a print image;
also, with aid of a printing unit, printing at least a first control field on the printing substrate, wherein the first control field has a predetermined pattern that includes at least the first color and the second color and is designed such that a color value of the first control field changes depending on a registration error between the first and the second color separations;

also printing a reference field on the printing substrate, a pattern of said reference field being predetermined such that it has a same color value independent of the registration error;

measuring the color value of the first control field with aid of a color value sensor;

also measuring the color value of the reference field with aid of the color value sensor and determining a desired color value depending on the color value of the reference field;

determining a deviation between the measured color value of the first control field and the desired color value, the deviation corresponding to a spatial shift of the color separations;

generating at least one control signal to reduce said spatial shift of the color separations depending on the determined deviation;

a plurality of control fields being printed, wherein in each control field regions of the two colors are shifted relative to one another by a different predetermined value;

determining a color value of each control field with aid of the color value sensor, and respectively calculating a deviation from the desired value;

selecting a control field with a smallest deviation;

multiplying a value by which regions of the two colors are shifted relative to one another in the selected control field by negative one and establishing the multiplied value as a value for an additional registration error; and establishing a control variable depending on actual registration error.

16. A method to control a color printer or color copier, comprising the steps of:

applying a color separation of a first color and a color separation of a second color to a printing substrate to be printed to in order to generate a print image;

also, with aid of a printing unit, printing at least a first control field on the printing substrate, wherein the first control field has a predetermined pattern that includes at least the first color and the second color and is designed such that a color value of the first control field changes depending on a registration error between the first and the second color separations;

also printing a reference field on the same printing substrate, the reference field having a predetermined pattern including at least the first color and the second color, wherein the pattern of the reference field is designed such that a degree of superposition of the first and the second colors of the pattern of said reference field remains constant independent of the registration error such that the pattern of the reference field has a same color value independent of the registration error;

measuring the color value of the first control field;

also measuring the color value of the reference field and determining a desired color value depending on the color value of the reference field;

determining a deviation between the measured color value of the first control field and the desired color value, the deviation corresponding to a spatial shift of the color separations; and generating at least one control signal to reduce said spatial shift of the color separations depending on the determined deviation.

* * * * *